(12) United States Patent
Wideman et al.

(10) Patent No.: US 11,126,591 B2
(45) Date of Patent: *Sep. 21, 2021

(54) FILTER FILE SYSTEM WITH INODE NUMBER AS PRIMARY DATABASE KEY

(71) Applicant: Quantum Corporation, San Jose, CA (US)

(72) Inventors: Roderick B. Wideman, Shakopee, MN (US); Don Doerner, San Jose, CA (US); Michael Zeis, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/669,574

(22) Filed: Oct. 31, 2019

(65) Prior Publication Data

US 2020/0065293 A1  Feb. 27, 2020

Related U.S. Application Data

(63) Continuation of application No. 15/007,267, filed on Jan. 27, 2016, now Pat. No. 10,503,692.

(60) Provisional application No. 62/111,172, filed on Feb. 3, 2015.

(51) Int. Cl.
*G06F 16/13* (2019.01)
*G06F 16/17* (2019.01)
*G06F 16/16* (2019.01)

(52) U.S. Cl.
CPC ............. *G06F 16/13* (2019.01); *G06F 16/16* (2019.01); *G06F 16/1734* (2019.01)

(58) Field of Classification Search
CPC ....... G06F 16/13; G06F 16/16; G06F 16/1734
See application file for complete search history.

(56) References Cited

U.S. PATENT DOCUMENTS

| | | |
|---|---|---|
| 7,249,219 B1 | 7/2007 | Mowat et al. |
| 7,277,899 B1 | 10/2007 | Salyzyn |
| 7,672,981 B1 | 3/2010 | Faibish et al. |
| 2007/0038689 A1 | 2/2007 | Shinkai |
| 2012/0030265 A1 | 2/2012 | Anderson et al. |

(Continued)

OTHER PUBLICATIONS

Non-Final Office Action dated Sep. 17, 2018 for U.S. Appl. No. 15/007,267.

(Continued)

*Primary Examiner* — Alicia M Willoughby
(74) *Attorney, Agent, or Firm* — Eschweiler & Potashnik, LLC

(57) ABSTRACT

Example apparatus and methods identify files that are so small or so large that they compromise the efficient operation of a file system that uses re-assignable one-to-one inodes and inode numbers. Small files are aggregated into collections of files and large files are subdivided into collections of smaller files. Information for locating multiple related files with fewer lookups is generated and stored in a folder. An inode having a new type of inode number is then created. The new type of inode number encodes information for finding the folder. The encoded information may include a folder identifier that acts as a primary key into a database that is configured to locate a member of the aggregated or subdivided files with a single lookup. A filter file system may be updated with the new inode. The new inode number is unique within the filter file system and may not be re-assigned.

17 Claims, 8 Drawing Sheets

(56) References Cited

U.S. PATENT DOCUMENTS

2012/0296872 A1  11/2012  Frost et al.
2014/0344538 A1  11/2014  Pawar et al.
2014/0351298 A1  11/2014  Kim

OTHER PUBLICATIONS

Final Office Action dated Apr. 15, 2019 for U.S. Appl. No. 15/007,267.
Notice of Allowance dated Aug. 6, 2019 for U.S. Appl. No. 15/007,267.

FILTER FILE SYSTEM WITH INODE NUMBER AS PRIMARY DATABASE KEY

CROSS REFERENCE TO RELATED APPLICATIONS

This Application is a Continuation of U.S. application Ser. No. 15/007,267, filed on Jan. 27, 2016, which claims the benefit of U.S. Provisional Application No. 62/111,172, filed on Feb. 3, 2015. The contents of the above-referenced Patent Applications are hereby incorporated by reference in their entirety.

BACKGROUND

Conventionally, inodes and files had a one-to-one relationship. A single inode was associated with a single file and a single file was associated with a single inode. This one-to-one relationship produced efficiency issues with small files because the metadata and inode allocated for a small file may have been excessive relative to the file size. In extreme cases, the inode used to find a small file may have been larger than the small file itself. This was inefficient because more storage space was being used to locate a small file than the file itself consumed. Additionally, when there were a large number of small files, the number of inodes associated with those small files may have grown to a size where searching the inode table become inefficient, particularly if the inode table could not be stored in a single unit (e.g., page) of memory.

On the other end of the spectrum, the metadata and inode for a large file may have been insufficient for efficiently locating various parts of the large file. The single inode may have only had enough room to locate the beginning of a file. If a user wanted to find the middle of the file or some other part of the file, then complicated and inefficient pointer following processing may have been required. If the file was spread over a number of locations or a number of devices, finding all the portions of the file may have required acquiring address information from multiple locations or devices.

These problems with conventional inodes were exacerbated by the fact that conventionally, inode numbers were assigned sequentially and encoded no information. Since the inode numbers encoded no information, the inode numbers may have been reassigned when they became available. For example, when a file for which an inode stored information was deleted, the inode number may have been reused. Conventionally, these inodes associated with reassignable inode numbers were stored sequentially in an inode table. The inode table may have been stored on a single device. This model for one-to-one reassignable inode numbers is sub-optimal for emerging data storage systems that store enormous amounts of data across multiple storage systems using a wide range of file sizes. For example, data may be archived in the cloud. An archive application may handle a slow trickle of data over a period of time and stores what may be the only copy of that data while a backup application may handle a large dump of data all at once and may store a second or third copy of data. Thus, an archive may place different demands on a file system and its inodes than a backup application or live file system.

A cloud archive may be built using, for example, a file system. The file system may be a shared disk file system (e.g., StorNext® by Quantum). The file system may include a plurality of different storage devices. Archive applications that use file systems face a number of challenges. One problem concerns handling a wide range of file sizes. For example, it may be difficult or inefficient to handle files ranging from as small as 1 KiB in size all the way up to 1 TiB in size in the same archive using conventional inodes because, when it comes to file sizes and inodes, one size does not fit all.

Metadata and an inode for a small file may be the same size as metadata and an inode for a large file, which may produce inefficiencies at both ends of the file size spectrum. For example, the metadata and inode for a small file may be excessive and the metadata and inode for a large file may be insufficient.

A file system may store data and metadata for billions of files. Conventional system designers may have never imagined an archive system or a file system handling even a million files. Thus, contemporary file systems that are three or four orders of magnitude larger than conventional file systems challenge conventional approaches to certain file system activities, particularly inode table size and relationships between inodes and files of different sizes. Conventional algorithms, approaches, and apparatus for interacting with file systems have suffered from performance degradation as file systems grow ever larger. The degradation is due, at least in part, to the one-to-one relationship between files and inodes and the form of conventional inodes.

A file system and a storage manager may provide a file locking storage area network (SAN) that gives access to files using a single namespace even though the files in the file system served by the namespace are spread across multiple devices. The functionalities (e.g., data mover, policy engine) associated with the storage manager and the file system need to be able to find and use metadata associated with the file system, need to be able to find and use files associated with the file system, and need to be able to perform other actions. These actions need to be performed efficiently and completed within a reasonable amount of time. Conventional inodes compromise the ability to perform these actions efficiently in suitable periods of time.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
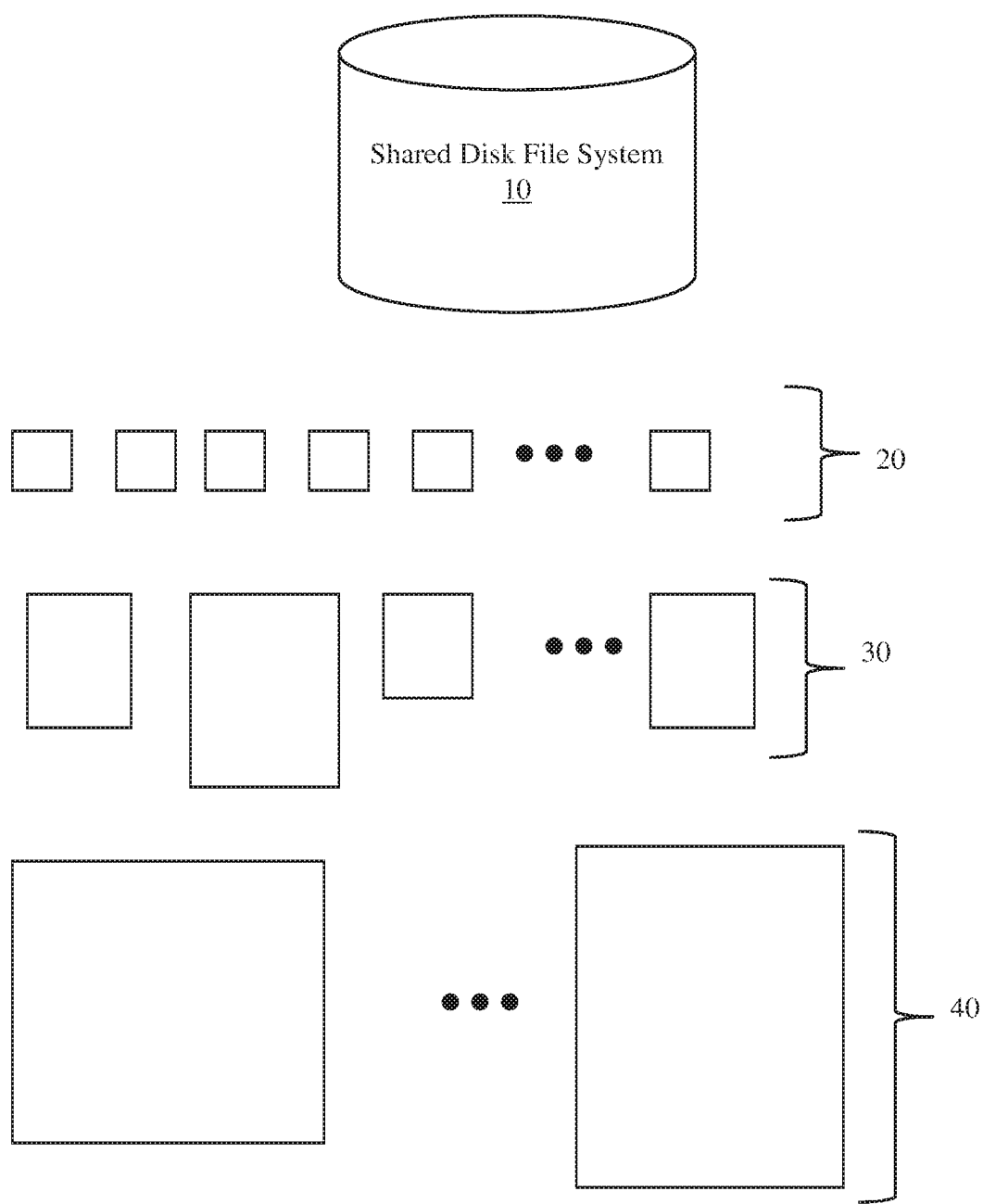
FIG. 1 illustrates an example shared disk file system.

Example apparatus and methods support a filter file system that addresses problems associated with conventional file systems. An example filter file system may change what information is stored about small files by aggregating them into a collection of files that meet a minimum size threshold. An example filter file system may change what information is stored for a file that exceeds a maximum size threshold by subdividing the file into a set of smaller files. In both cases, the changes to what is stored may be made without physically relocating the files. The changes may be made in a database that replaces some functionality associated with conventional inodes and conventional storage. Aggregating small files into a collection of files addresses one part of the range of file size problem by grouping smaller files together until a threshold file size is reached. Subdividing a larger file into a collection of smaller files addresses another part of the range of file size problem by splitting the large file into smaller files until a threshold file size is met. The grouping and splitting may be logical rather than physical with the logical reorganization being recorded in the database instead of in individual inodes. The filter file system may support the aggregated files or subdivided file using a new type of inode that encodes information for efficiently accessing the database and thus for more efficiently accessing the files.

Conventionally, inodes and files had a one-to-one relationship. A single inode was associated with a single file and a single file was associated with a single inode. This one-to-one relationship produced issues with small files because the metadata and inode allocated for a small file may have been excessive relative to the file size. In extreme cases, the inode used to find a small file may have been larger than the small file itself. This was inefficient because more storage space was being used to store how to locate a file than the file itself consumed. Additionally, when there were a large number of small files, the number of inodes may have grown to a size where searching the inode table became inefficient, particularly if the inode table could not be stored in a single unit (e.g., page) of memory. Aggregating files into a larger collection of files may amortize the amount of space allocated for an inode over a larger amount of data. Storing information for locating multiple small files with a single database lookup may improve efficiency over multiple inode table lookups.

On the other end of the spectrum, the metadata and inode for a large file may have been insufficient for efficiently locating various parts of the large file. The single inode may have only had enough room to locate the beginning of a file. If a user wanted to find the middle of the file or some part other than the start of the file, then complicated and inefficient processing may have been required. If the file was spread over a number of locations or a number of devices, finding all the portions of the file may have required following linked lists or other data structures, with address information being acquired from multiple locations or devices. Subdividing a file into a set of smaller files may allow more efficiently locating the various parts of the file with less complicated data structure following. Storing information for locating multiple different portions of a large file using a single database lookup may improve efficiency over an inode table lookup followed by complicated linked list following.

Efficiently locating the files produced by aggregating small files into larger files and subdividing larger files into smaller files may be facilitated by a new type of inode number employed by a filter file system. A filter file system may be, for example, a data-less file system. A data-less file system stores no data. It only stores location information (e.g., pointers, addresses, folder numbers, lookaside information) for files. A data shaper is one instance of a filter file system. A data shaper may be used to produce containers for which locating information can be encoded into example inode numbers. An archive may be implemented using a filter file system.

In one embodiment, a filter file system may use a 64-bit inode number that facilitates performing efficient database lookups and avoiding multiple inode table searches. Some of the 64 bits may be used to encode a folder number and other of the 64 bits may be used to encode lookaside information. The folder number may have information about a user-created folder in which information for finding related (e.g., aggregated, subdivided) files is located. The filter file system may produce folder numbers for the user-created folders. In one embodiment the folders may be associated with network attached storage (NAS) shares. In one embodiment, the folders may be associated with locations in a directory hierarchy. The lookaside information may have information about small files that were grouped or aggregated together into larger files. The lookaside information may also have information about portions of a larger file that was subdivided into smaller files. The information about aggregated files or a subdivided file may be stored in a tree of directories. The tree of directories may include information about a container database or a container in a database. The tree of directories may store information about an inode cluster, which may be an aggregation of files that when located collectively may improve file system efficiency.

In one embodiment, the new type of inode may store a mapping for locating a cluster or a container of files instead of just one file. When an inode or inode number can store information about a cluster, container, aggregation, or grouping of files, then the inefficiencies associated with an inode handling a small file may be mitigated. In one embodiment, the inode may store a mapping for locating the related portions of a file instead of just one large file. When an inode or inode number can store information about more manageable-sized portions of a large file, then the inefficiencies associated with a single inode handling a large file may be mitigated.

In one embodiment, the new inode may store original inode number(s) associated with files that are aggregated or subdivided. Having the original inode numbers available facilitates having the filter file system accept items, organize (e.g., aggregate, containerize, sub-divide) items and output the items without actually changing the items.

Example apparatus and methods may control a filter file system to take responsibility for inode generation and inode number generation. The filter file system may produce inode numbers that are unique within a file system and that may not be reassigned once assigned. Not reassigning an inode number facilitates using the inode and inode number in a new and different way that may make a filter file system operate more efficiently. Instead of using the conventional approach of assigning the next sequential number for an inode and having a one-to-one relationship between inodes and files, the filter file system may encode information in the inode number that will allow the inode number to act as a key (e.g., primary key) into a database and that will allow the inode to be involved in a one-to-many or many-to-one relationship. The encoded information may include, for example, a folder number and a lookaside space where information (e.g., addresses) about files can be stored. The folder number may correspond to, for example, a directory identifier. The lookaside space may correspond to, for example, a cache area.

Since the filter file system inode number encodes information (e.g., database primary key) that allows files to be found more efficiently, a computer may operate more efficiently. In one example, items may be found faster because resolving a level of indirection is removed from the processing required to locate an actual address. This is achieved because the inode number itself can directly encode information for file locating. Instead of having to look in the inode table for an inode and then having to look in the inode itself to start the search for file-locating information, mere possession of the inode number provides information that can start a file locating process. Additionally, instead of storing all the file-locating information in the inode, some file-locating information may be stored in a database. It may be more efficient to search an optimized database for file-locating information associated with multiple files than to do multiple searches of an inode table and then an inode for multiple individual files. The file-locating information may be stored in a database and a portion of the inode number may be used as a primary key into the database. Removing a level of indirection may increase efficiency.

Thus, example apparatus and methods provide a solution to the computer-specific problem of having a file system that is providing an archive capability in the cloud handle files efficiently of widely different sizes using re-assignable one-to-one inodes whose inode numbers encode no file locating information.

FIG. 1 illustrates an example shared disk file system 10 that will store information for small files 20, normal sized files 30, and large files 40. The small files 20 have sizes that fall below a minimum file size and thus may be aggregated into files that have sizes falling within an acceptable range. The large files 40 have sizes that exceed a maximum file size and thus may be subdivided into smaller files.

Figure 2:
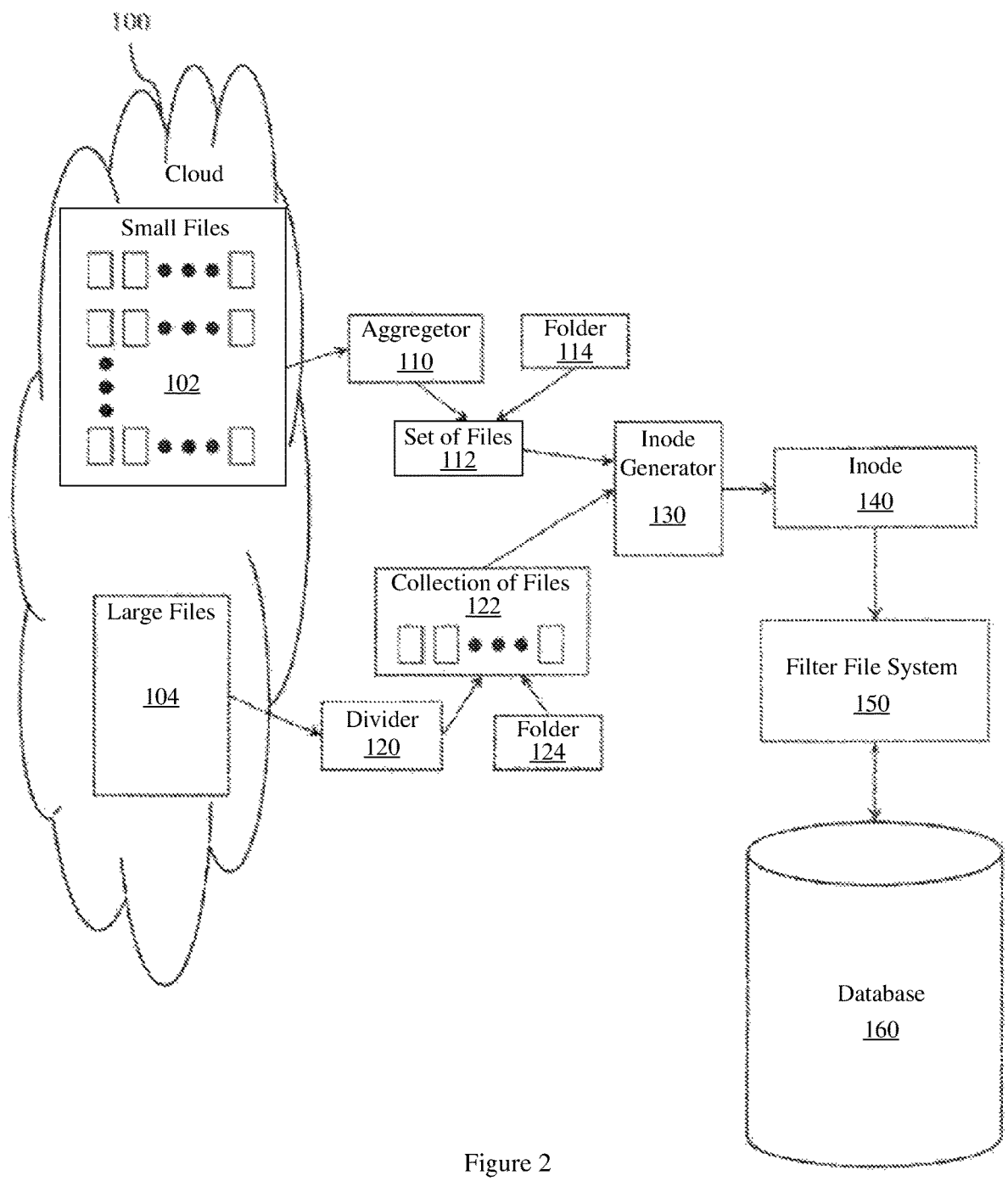
FIG. 2 illustrates an example data flow associated with a filter file system with an inode number configured as a primary database key.

FIG. 2 illustrates an example data flow associated with a filter file system 150 that uses an inode number configured as a primary database key. A filter file system may contain no storage but may, for example, examine and possibly transform data that passes through the filter file system en route to another destination. The other destination may be, for example, a backing file system. Filter file systems may be composed, which may be referred to as stacking file systems. Two filter file systems A and B, where data is ingested into file system A before being presented to file system B, may be referred to as A being stacked on B, which may be written A|B. Stacking order may not be commutative (e.g., A|B does not equal B|A). One function performed by a filter file system may be to slice large files into smaller pieces. Another function performed by a filter file system may be to aggregate small files into larger files. When a large file is sliced into smaller pieces, the smaller pieces may be referred to as "segment files". The segment files may be stored together in a segment directory. Large files in a first namespace may be replaced by directories in a second namespace. In one embodiment, the name of a segment directory may be derived from the name of the large file. The name of a segment file may also be derived from the name of the large file, however the name of the segment file may include additional information that provides, for example, offset or length information. For example, a large file foo.txt in a first namespace may be segmented into four files by a filter file system. The four files may be stored by the filter file system in a directory named foo.txt in a second namespace. The four files may be named footxtoff1off2, where off1 identifies a starting offset in the original large file and off2 identifies an ending offset in the original large file. Other naming approaches may be employed.

A cloud 100 may store small files 102 and large files 104. Files having sizes that are within a desired size range are not illustrated for ease of understanding. Small files 102 may be aggregated by an aggregator 110 that produces a set of files 112 that can be treated collectively. The aggregator 110 may be part of a filter file system. A folder 114 may store information about where members of the set of files 112 are located. The folder 114 may correspond to a directory. Large file 104 may be partitioned by a divider 120 that produces a collection of files 122. The divider 120 may be part of a filter file system. A folder 124 may store information about where members of the collection of files 122 are located. Folder 124 may correspond to a directory. An inode generator 130 will produce an inode 140 that encodes information for locating folder 114 or folder 124. Filter file system 150 may use the inode number for inode 140 as a primary key for a table in database 160. The table in database 160 may store information associated with folder 114 or folder 124 to facilitate locating files in an efficient database table lookup rather than using a comparatively inefficient inode number to inode table to inode to inode content lookup.

Figure 3:
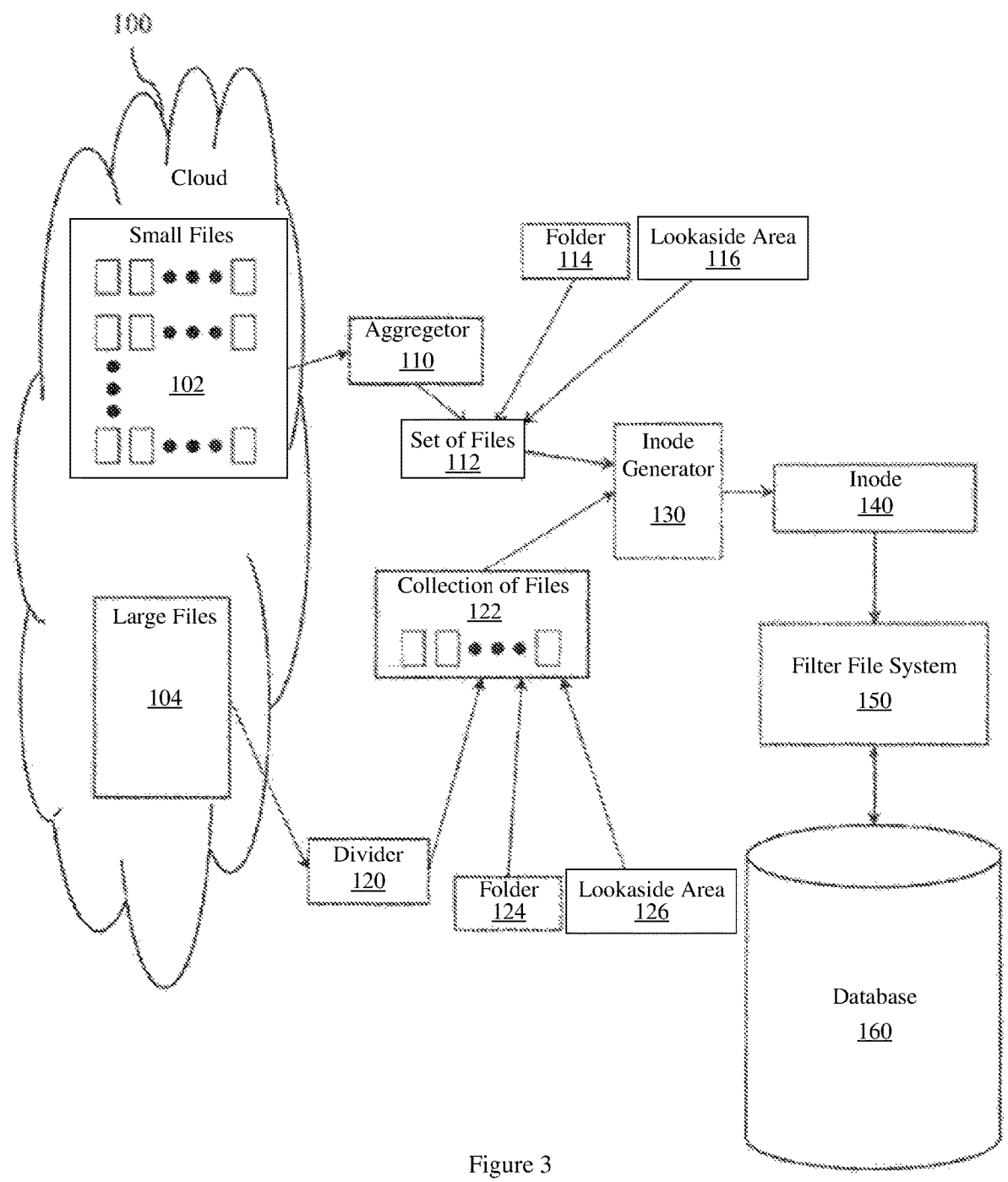
FIG. 3 illustrates an example data flow associated with a filter file system with an inode number configured as a primary database key.

FIG. 3 illustrates another example data flow associated with a filter file system 150 that uses an inode number configured as a primary database key. This data flow includes a lookaside area 116 and a lookaside area 126. The lookaside areas may also be used to store information about aggregations or collections of files. The lookaside areas may store, for example, tree identifiers that store hierarchical information for locating files. The lookaside areas may, additionally or alternatively, store container identifiers that store object information for locating files. The lookaside areas may correspond to cache areas.

Figure 4:
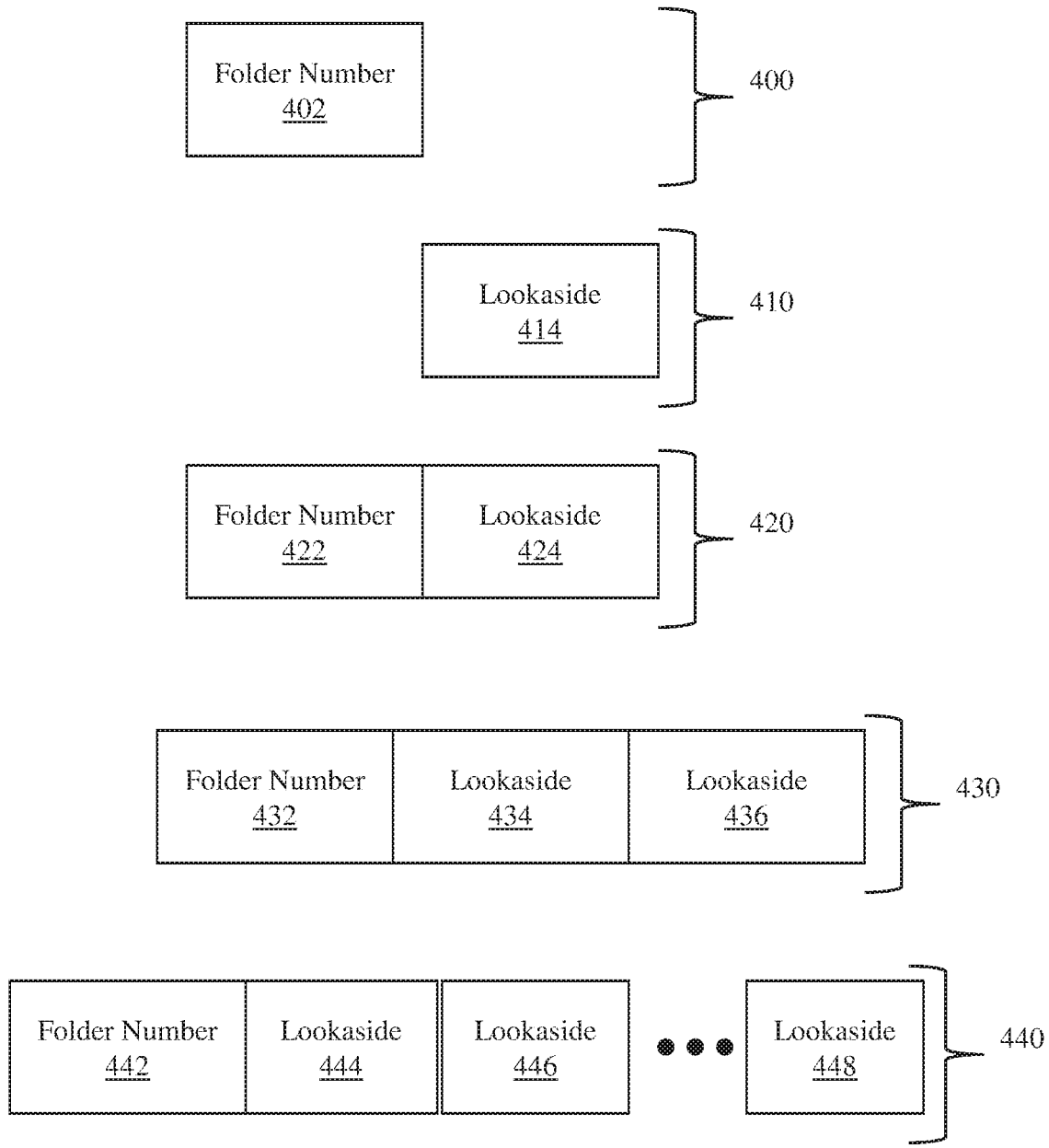
FIG. 4 illustrates example inode numbers.

FIG. 4 illustrates example inode numbers. Inode number 400 may store just a folder number 402. The folder number 402 may encode information that allows the folder number 402 to be used as a primary key into a database table. Inode number 410 may store just a lookaside area identifier 414. The lookaside area identifier 414 may also encode information that allows it to be used as a primary key into a database table. Inode number 420 stores both a folder number 422 and a lookaside area identifier 424. The database table may store, for example, the address of the file(s) to be located.

Inode 430 includes a single folder number 432 and lookaside area identifiers 434 and 436. Inode 440 includes a more general case where there is a single folder number 442 and a number of lookaside area identifiers 444, 446, . . . 448. While a single folder number 442 is illustrated, an inode number may store multiple folder numbers or multiple lookaside numbers.

Figure 5:
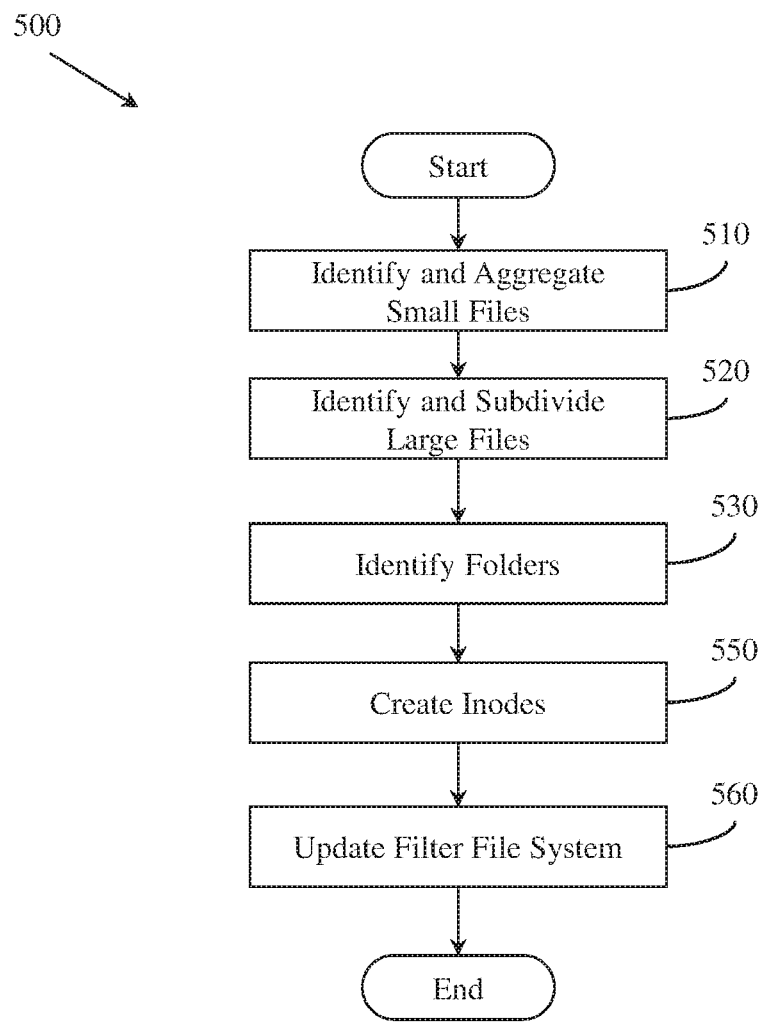
FIG. 5 illustrates an example method associated with a filter file system with an inode number configured as a primary database key.

FIG. 5 illustrates an example method 500 associated with a filter file system with an inode number configured as a primary database key. Method 500 includes, at 510, identifying a set of files stored in a first file system. Members of the set of files have file sizes less than a minimum file size (e.g., 1 KB, 1 page, 1 MB). Identifying the set of files may include, for example, using a conventional inode associated with the files to access file size information. Method 500 also includes, at 510, selectively aggregating two or more members of the set of files into an aggregated group of files. In one embodiment, the aggregated group of files is bigger than the minimum file size. In another embodiment, the aggregated group of files is less than the minimum file size.

Method 500 includes, at 520, identifying a large file in the file system. Identifying the large file may include, for example, using a conventional inode associated with the large file to access file size information. The large file has a file size greater than a maximum file size (e.g., 1 MB, 1K pages, 1 GB, 1 TB). Method 500 also includes, at 520, selectively subdividing the large file into a subdivided group of files. Subdividing the large file may include, for example, identifying start and end addresses for smaller portions of the file, identifying pages to be included in smaller portions of the file, actually writing new smaller files that are parsed out of the large file, or other actions. In one embodiment, members of the subdivided group of files have file sizes less than the maximum file size. In another embodiment, members of the subdivided group of files are simply smaller than the original file and may still exceed the maximum file size. The set of files may be, for example, part of a cloud-based archive that is stored by a shared disk file system. Similarly, the large file may be part of a cloud-based archive that is stored by a file system. In one embodiment, the file system may be a shared disk file system.

Method 500 includes, at 530, identifying a first folder associated with the aggregated group of files. The folder may have been created by a user or by a file system. The folder may be a location in a data store, a file, an area of memory, a directory, or other computerized storage location. The first folder has a first folder identifier that is configured as a primary key into a database. Being configured as a primary key into a database may include, for example, having a number and arrangement of bits that correspond to an addressing or lookup protocol for the database table. The database stores an address for locating a member of the aggregated group of files. The address may be an original location where the member was located or may be a new location where the aggregation is stored. The first folder stores information for locating two or more members of the aggregated group of files. Thus, rather than finding one file per inode and inode table access, two or more files may be found with a single database lookup.

Method 500 also includes, at 530, identifying a second folder associated with the subdivided group of files. The second folder has a second folder identifier that is configured as a primary key into the database. The second folder may be, for example, a directory. The database also stores an address for locating a member of the subdivided group of files. The address may be an original location where the large file was stored or may be a new location where just a portion of the large file was written. The second folder stores information for locating two or more members of the subdivided group of files. Thus, rather than finding one file per inode and inode table access, two or more portions of the large file may be found with a single database lookup.

Method 500 includes, at 550, creating a first inode in a filter file system. Creating the inode may include making a request to an inode generating circuit or process in the filter file system. The first inode has a first inode number that encodes the first folder identifier. Encoding the first file folder identifier may include replicating, storing, hashing, or otherwise including information for retrieving the first folder identifier from the inode number. Method 500 also includes, at 550, creating a second inode in the filter file system. The second inode has a second inode number that encodes the second folder identifier. Encoding the second folder identifier may also include replicating, storing, hashing, or otherwise including information for retrieving the second folder identifier from the inode number.

Creating the first inode or the second inode at 550 may include additional actions. For example, creating the first inode may include storing the inode number from the first file system for a member of the aggregated group of files in the first inode. Similarly, creating the second inode may include storing the inode number from the first file system for the large file in the second inode. To solve problems associated with re-assignable inode numbers, creating the first inode at 550 may include creating the first inode number as a unique number within the filter file system and controlling the filter file system to prevent the first inode number from being re-assigned. Preventing an inode number from being reassigned may include, for example, removing the inode number from a pool of available numbers, adding the inode number to a list of assigned numbers, updating a data structure or process that controls inode number generation, or other action. Similarly, creating the second inode may include creating the second inode number as a unique number within the filter file system and controlling the filter file system to prevent the second inode number from being reassigned.

Method 500 includes, at 560, updating the filter file system with the first inode and updating the filter file system with the second inode. While creating two inodes and updating the filter file system with the two inodes is described, in one embodiment, method 500 may only aggregate files or may only subdivide files.

Figure 6:
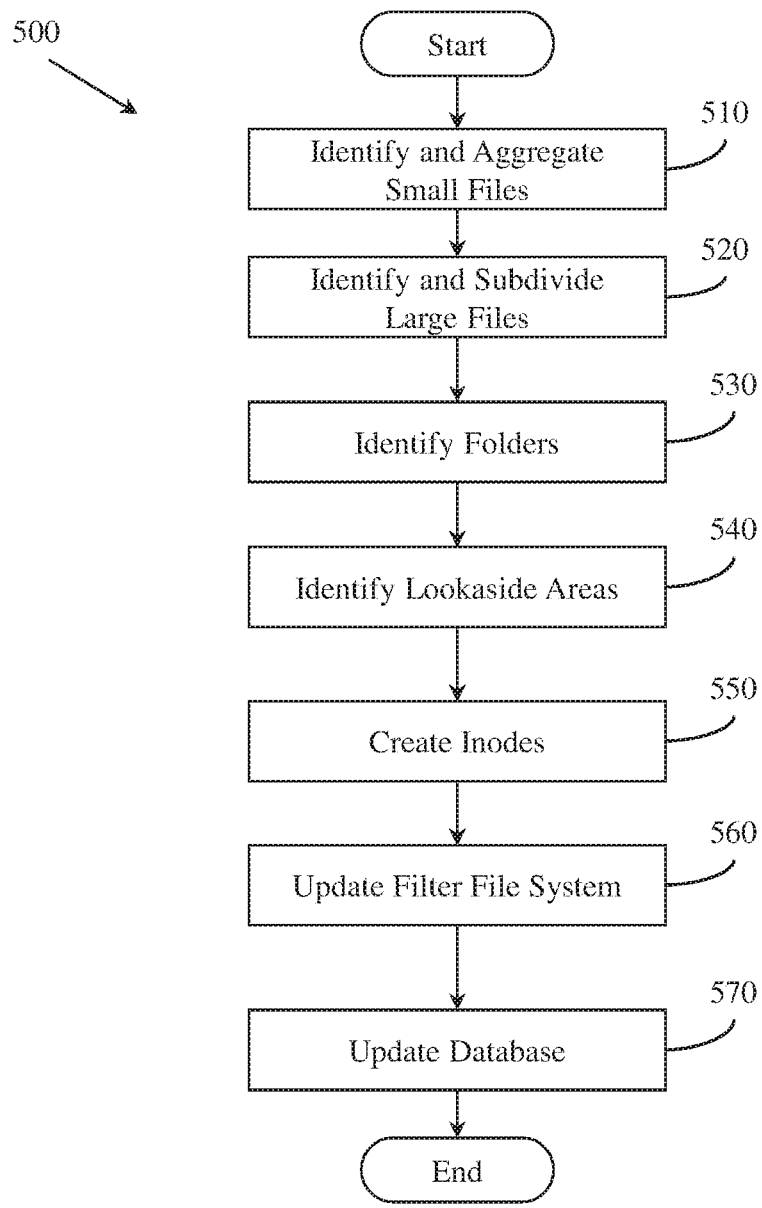
FIG. 6 illustrates an example method associated with a filter file system with an inode number configured as a primary database key.

FIG. 6 illustrates another embodiment of method 500. This embodiment also includes, at 540, identifying a first lookaside area associated with the aggregated group of files. The first lookaside area has a first lookaside area identifier that is configured as a primary key into the database. The lookaside area may be, for example, a temporary cache area. Creating the first inode at 550 may include configuring the first inode number to encode the first lookaside area identifier. Method 500 also includes, at 540, identifying a second lookaside area associated with the subdivided group of files. The second lookaside area has a second lookaside area identifier that is configured as a primary key into the database. The lookaside area may be, for example, a temporary cache area. Creating the second inode at 550 may include configuring the second inode number to encode the second lookaside area identifier. The lookaside area may have been created by a user or by a file system. The lookaside area may be, for example, a location in a data store, a file, an area of memory, or other computerized storage location.

The inode may take different forms and have different sizes. For example, an inode number may have 64 bits, with 16 bits allocated for encoding folder identifiers and 16 bits allocated for encoding lookaside areas. Other inodes may have other inode number sizes and may have other numbers of bits allocated for encoding folder identifier information or lookaside area identifier information.

The lookaside areas may store information for locating files in a manner that is more efficient than looking for each file by accessing an inode table, retrieving an inode from the inode table, and then examining the contents of the inode for location information. For example, a lookaside area may store a tree identifier for a tree that stores information for locating two or more files. Accessing information for locating two or more files in a single location may be more efficient than accessing information for locating each file individually. While a tree identifier is described, in another embodiment a lookaside area may store a container identifier for a container that stores information for locating two or more files at the same time.

Example filter file systems use a database to store file locating information instead of a conventional inode in a conventional inode table. Thus, this embodiment of method 500 also includes, at 570, updating the database with a record comprising the first folder identifier and information for locating members of the aggregated group of files using a single lookup in the database. Method 500 also includes, at 570, updating the database with a record comprising the second folder identifier and information for locating members of the subdivided group of files using a single lookup in the database. Updating the database may include, for example, performing an SQL operation, making a request to the database, providing data to the database, or other action.

Figure 7:
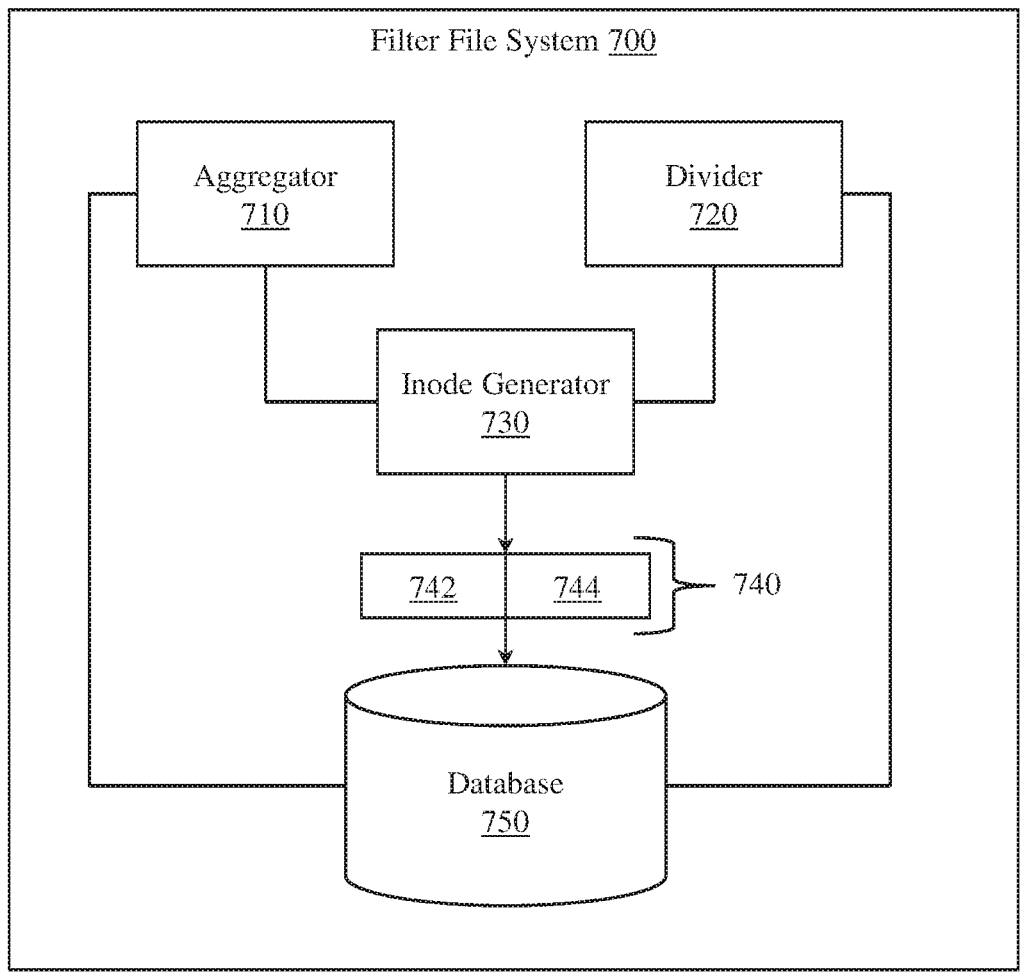
FIG. 7 illustrates an example filter file system that uses an inode number configured as a primary database key.
Figure 8:
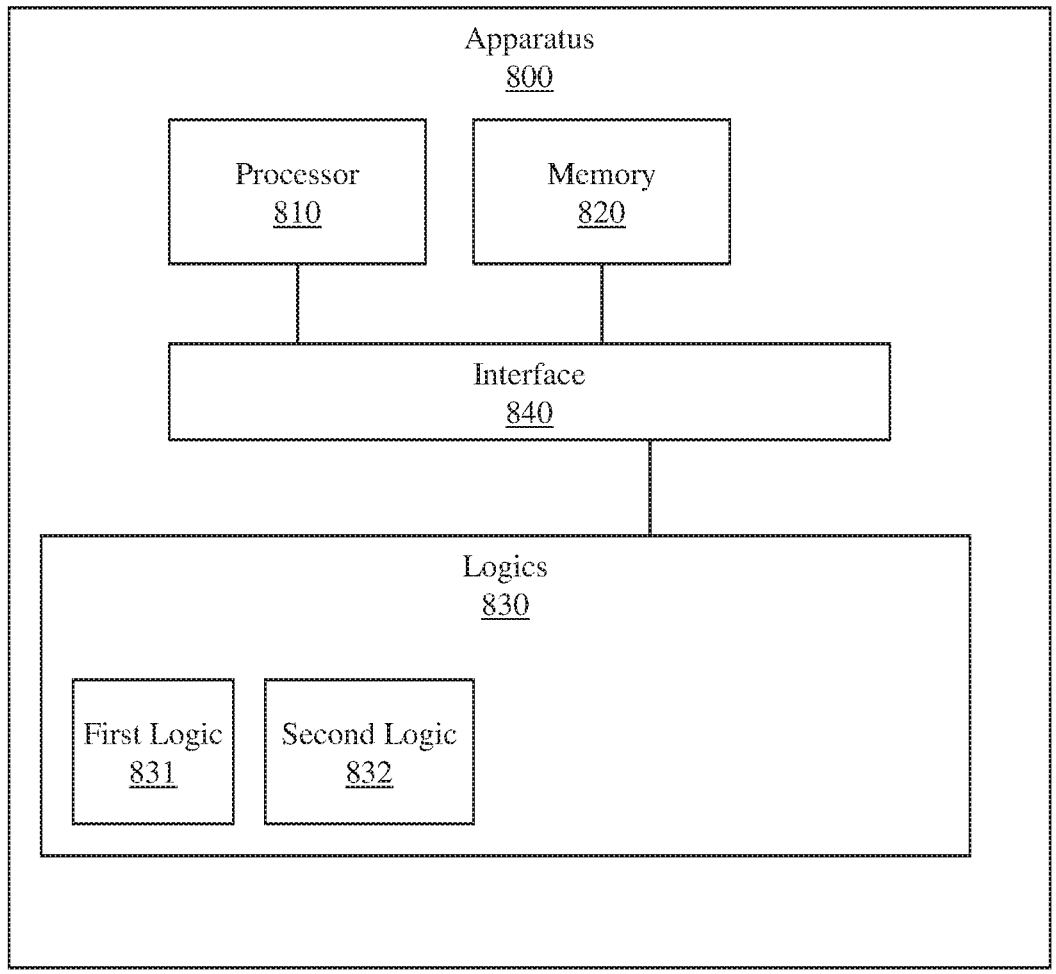
FIG. 8 illustrates an example apparatus associated with a filter file system with an inode number configured as a primary database key.

FIG. 7 illustrates an example filter file system 700 that uses an inode number configured as a primary database key. Filter file system 700 includes a file aggregator 710 that collects two or more files into a first file. The two or more files may be selected because their sizes fall below a threshold size (e.g., 1 KB, 1 page). The file aggregator 710 may be, for example, a circuit, a process running on a computer, a thread, or other computer-implemented process for aggregating files. Since the files are made from electronic computer data, it is physically impossible to aggregate the files using the human mind or paper and pencil. The human mind is incapable of rearranging voltages and charges on a computer-readable storage device (e.g., disk, memory). Similarly, it is impossible to rearrange voltage and charges on a computer-readable storage device using pencil and paper.

Filter file system 700 also includes a file divider 720 that separates a large file into two or more second files. The large file may be selected because its size exceeds a threshold size (e.g., 100 MB, 1 GB). The file divider may be, for example, a circuit, a process running on a computer, a thread, or other computer-implemented process for dividing a file. Since the file is made from electronic computer data, it is physically impossible to divide the file using the human mind or paper and pencil. The human mind is incapable of rearranging voltages and charges on a computer-readable storage device (e.g., disk, memory). Similarly, it is impossible to rearrange voltage and charges on a computer-readable storage device using pencil and paper.

Filter file system 700 also includes a database 750 that stores addresses for locating the two or more files that were collected into the first file, and that stores addresses for locating the two or more second files produced from the large file. The addresses that are stored may be the addresses where the original contents of the small files or the large file reside. While the database 750 is illustrated as being a part of filter file system 700, database 750 may be a separate entity with which filter file system 700 interacts.

The filter file system 700 also includes an inode generator 730 that produces an inode for the filter file system 700. The inode has an inode number 740 that includes a portion that is configured as a primary key into a table in the database 750. In one embodiment, the inode number 740 may include a portion 742 that encodes folder information. In another embodiment, the inode number 740 may include a portion 744 that includes lookaside area information. As illustrated in FIG. 4, different numbers and combinations of folder identifiers and lookaside area identifiers may be encoded into an inode number.

The inode generator 730 causes the inode number 740 to be unique in the filter file system 700. The inode generator 730 is configured to only assign the inode number 740 a single time. This resolves the issue associated with re-assignable inode numbers found in conventional systems.

Apparatus 800 includes a processor 810, a memory 820, and a set 830 of logics that is connected to the processor 810 and memory 820 by a computer hardware interface 840. In one embodiment, the apparatus 800 may be a stand-alone device connected to a data communication network. In another embodiment, apparatus 800 may be integrated into another device (e.g., deduplication apparatus) or system (e.g., object storage system). The memory 820 stores electronic data associated with an inode whose inode number encodes information including, for example, a folder and a lookaside area.

The set 830 of logics may include a first logic 831 that selectively aggregates a first set of files into an aggregation. Members of the first set of files are selected because they have file sizes smaller than a minimum file size. In one embodiment, the aggregation may be a physical aggregation where a new file is created and written. In another embodiment, the aggregation may be a logical aggregation where the original files remain in their original locations but new locating information is created and stored together.

The first logic 831 builds a first inode having a first inode number that encodes information for simultaneously locating two or more members of the aggregation in a single operation. The single operation may be, for example, a lookup in a database table in a database. In one embodiment, the database may be a structured query language (SQL) database.

The apparatus 800 may also include a second logic 832 that selectively sub-divides a large file into a second set of files. The large file may be selected because its file size exceeds a maximum file size. The second logic 832 will divide the large file so that individual members of the second set of files are smaller than the maximum file size. In one embodiment, the dividing may be a physical dividing where new files are created and written. In another embodiment, the dividing may be logical and the large file may remain intact. When the dividing is logical, new information for locating the various subdivisions of the large file may be created and stored. The second logic 832 builds a second inode having a second inode number. The second inode number encodes information for simultaneously locating two or more members of the second set of files in a single operation.

In one embodiment, a shared disk file system stores the first set of files and the large file. In one embodiment, the large file and the first set of files are part of a cloud-based archive stored by a shared disk file system.

The first logic 831 may build the first inode number to be unique within the shared disk file system. In one embodiment, the encoded information for locating two or more members of the aggregation is configured for use as a primary key for a lookup in a database that stores information for locating files in the shared disk file system. Similarly, the second logic 832 builds the second inode number to be unique within the shared disk file system. In one embodiment, the encoded information for locating two or more members of the second set of files is also configured for use as a primary key for a lookup in the database.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing instructions that when executed by a processor to perform operations, the operations comprising:
   identifying a set of files stored in a first file system, where members of the set of files have file sizes less than a minimum file size;
   selectively aggregating two or more members of the set of files into an aggregated group of files;
   identifying a first folder associated with the aggregated group of files, where the first folder has a first folder identifier, where the first folder identifier is configured as a primary key into a database, where the database stores an address for locating a member of the aggregated group of files, and where the first folder stores information for locating two or more members of the aggregated group of files;
   creating a first inode in a filter file system, where the first inode has a first inode number, where the first inode number encodes the first folder identifier;
   updating the filter file system with the first inode;
   identifying a large file in the first file system, where the large file has a file size greater than a maximum file size;
   selectively subdividing the large file into a subdivided group of files;
   identifying a second folder associated with the subdivided group of files, where the second folder has a second folder identifier, where the second folder identifier is configured as another primary key into the database, where the database stores an address for locating a member of the subdivided group of files, and where the second folder stores information for locating two or more members of the subdivided group of files;
   creating a second inode in the filter file system, where the second inode has a second inode number, where the second inode number encodes the second folder identifier; and
   updating the filter file system with the second inode.

2. The non-transitory computer-readable storage device of claim 1, the operations further comprising updating the database with a record comprising the first folder identifier and information for locating members of the aggregated group of files using a single lookup in the database.

3. The non-transitory computer-readable storage device of claim 1, the operations further comprising updating the database with a record comprising the second folder identifier and information for locating members of the subdivided group of files using a single lookup in the database.

4. The non-transitory computer-readable storage device of claim 1, the operations further comprising:
   identifying a first lookaside area associated with the aggregated group of files, where the first lookaside area has a first lookaside area identifier configured as a primary key into the database, and
   where creating the first inode in the filter file system includes configuring the first inode number to encode the first lookaside area identifier.

5. The non-transitory computer-readable storage device of claim 4, where the first lookaside area stores a tree identifier for a tree that stores information for locating two or more members of the aggregated group of files, or stores a container identifier for a container that stores information for locating two or more members of the aggregated group of files.

6. The non-transitory computer-readable storage device of claim 1, the operations further comprising:
   identifying a second lookaside area associated with the subdivided group of files, where the second lookaside area has a second lookaside area identifier configured as a primary key into the database; and
   where creating the second inode in the filter file system includes configuring the second inode number to encode the second lookaside area identifier.

7. The non-transitory computer-readable storage device of claim 6, where the second lookaside area stores a tree identifier for a tree that stores information for locating two or more members of the subdivided group of files, or stores a container identifier for a container that stores information for locating two or more members of the subdivided group of files.

8. The non-transitory computer-readable storage device of claim 1, where the set of files are part of a cloud-based archive that is stored by a file system and where the large file is part of a cloud-based archive that is stored by a file system.

9. The non-transitory computer-readable storage device of claim 1, the operations further comprising storing the first inode number from the first file system for a member of the aggregated group of files in the first inode.

10. The non-transitory computer-readable storage device of claim 1, the operations further comprising storing the first inode number from the first file system for the large file in the second inode.

11. The non-transitory computer-readable storage device of claim 1, where creating the first inode includes creating the first inode number as a unique number within the filter file system and controlling the filter file system to prevent the first inode number from being re-assigned, where the first inode number has a first inode number size, where a first portion of the first inode number size is allocated for encoding the first folder identifier and a second, different portion of the first inode number size is allocated for encoding a first lookaside area identifier.

12. The non-transitory computer-readable storage device of claim 1, where creating the second inode includes creating the second inode number as a unique number within the filter file system and controlling the filter file system to prevent the second inode number from being reassigned, where the second inode number has a second inode number size, where a first portion of the second inode number size is allocated for encoding the second folder identifier and a second, different portion of the second inode number size is allocated for encoding a second lookaside area identifier.

13. An apparatus, comprising:
a processor;
a memory;
a set of circuits; and
an interface to connect the processor, the memory, and the set of circuits, the set of circuits including:
  a first circuit configured to:
    identify files stored in a file system having members of files with file sizes less than a minimum file size;
    selectively aggregate two or more members of a first set of files into an aggregation as an aggregated group of files;
    identify a first folder associated with the aggregated group of files, where the first folder has a first folder identifier configured as a primary key into a database that stores an address for locating a member of the aggregated group of files;
    build a first inode in the file system, the first inode having a first inode number that encodes information including the first folder identifier for locating the two or more members of the aggregation in a single operation; and
    update the file system with the first inode; and
  a second circuit configured to:
    identify a large file in the file system, the large file having a file size greater than a maximum file size;
    selectively sub-divide the large file into a second set of files as a subdivided group of files;
    identify a second folder associated with the subdivided group of files, where the second folder has a second folder identifier configured as another primary key into the database, and stores information for locating two or more members of the subdivided group of files, where the database stores an address for locating a member of the subdivided group of files;
    build a second inode in the file system, the second inode having a second inode number that encodes information including the second folder identifier for locating two or more members of the second set of files in a single operation; and
    update the file system with the second inode.

14. The apparatus of claim 13, where the first circuit is configured to build the first inode number to be unique within a shared disk file system, where the shared disk file system stores the first set of files, and where the encoded information for locating two or more members of the aggregation is configured for use as a primary key for a lookup in a database that stores information for locating files in the shared disk file system.

15. The apparatus of claim 13 where the second circuit is configured to build the second inode number to be unique within a shared disk file system, where the shared disk file system stores the large file, and where the encoded information for locating two or more members of the second set of files is configured for use as a primary key for a lookup in the database.

16. The apparatus of claim 13, where the first set of files are the same before and after the selective aggregation of the first set of files and the building of the first inode.

17. A filter file system, comprising:
a memory;
a processor;
a file aggregator configured to collect two or more files into a first file where the two or more files have file sizes less than a minimum file size;
a database configured to store addresses for locating the two or more files that were collected into the first file;
an inode generator configured to produce inodes for the filter file system, where the inodes comprise an inode number that includes a portion that is configured as a primary key into a table in the database that stores addresses for locating the two or more files that were collected into the first file, and where the inode number includes two or more portions that are configured as primary keys into one or more tables in the database;
where the inodes comprise:
  a first inode having a first inode number that encodes information including a first folder identifier of a first folder associated with an aggregated group of files for locating the two or more files of an aggregation in a single operation, and where the first folder identifier is configured as a primary key into the database that stores an address for locating the two or more files of the aggregated group of files; and
  where the inode generator further updates the filter file system with the first inode;
a file divider configured to separate a large file having a file size greater than a maximum file size into two or more second files;
where the database is further configured to store addresses for locating the two or more second files produced from the large file;
where the inode generator is further configured to produce inodes for the filter file system, where the inodes comprise an inode number that includes a portion that is configured as a primary key into a table in the database that stores addresses for locating the two or more files that were collected into the first file or for locating the two or more second files;
where the inodes further comprise a second inode having a second inode number that encodes information including a second folder identifier of a second folder associated with a subdivided group of files from the large file for locating the two or more second files in a single operation, and where the second folder identifier is configured as another primary key into the database and stores information for locating the two or more second files in the subdivided group of files; and
where the inode generator further updates the filter file system with the second inode.

* * * * *